United States Patent
Mori

(10) Patent No.: US 12,456,326 B2
(45) Date of Patent: *Oct. 28, 2025

(54) ELECTRONIC DEVICE

(71) Applicant: InnoLux Corporation, Miao-Li County (TW)

(72) Inventor: Ayumu Mori, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 53 days.

This patent is subject to a terminal disclaimer.

(21) Appl. No.: 18/523,796

(22) Filed: Nov. 29, 2023

(65) Prior Publication Data

US 2024/0104953 A1     Mar. 28, 2024

Related U.S. Application Data

(63) Continuation of application No. 17/893,167, filed on Aug. 22, 2022, now Pat. No. 11,869,269, which is a continuation of application No. 16/590,332, filed on Oct. 1, 2019, now Pat. No. 11,450,088.

(51) Int. Cl.
  *G06V 40/13*    (2022.01)
  *G06V 10/141*   (2022.01)
  *G06V 10/143*   (2022.01)

(52) U.S. Cl.
  CPC ........ *G06V 40/1318* (2022.01); *G06V 10/141* (2022.01); *G06V 10/143* (2022.01)

(58) Field of Classification Search
  CPC . G06V 40/1318; G06V 10/141; G06V 10/143
  See application file for complete search history.

(56) References Cited

U.S. PATENT DOCUMENTS

| | | | | |
|---|---|---|---|---|
| 6,671,392 | B1 * | 12/2003 | Shigematsu | G06V 40/12 382/124 |
| 7,819,311 | B2 * | 10/2010 | Rowe | B60R 25/252 235/382 |
| 9,020,180 | B2 * | 4/2015 | Levinsohn | H04R 1/04 381/124 |
| 10,440,361 | B2 * | 10/2019 | Hensler | H04N 19/115 |

(Continued)

FOREIGN PATENT DOCUMENTS

| | | |
|---|---|---|
| CN | 109255285 A | 1/2019 |
| WO | WO-2020124511 A1 * | 6/2020 |

*Primary Examiner* — John B Strege
(74) *Attorney, Agent, or Firm* — Winston Hsu

(57) ABSTRACT

An electronic device includes a detection region, wherein the electronic device includes a plurality of first units, a plurality of second units, and a sensor module. A portion of the plurality of first units is configured to generate a first signal. A portion of the plurality of second units is configured to generate a second signal, and the first signal and the second signal have different properties. When the detection region is detected, a first region is generated by the first signal, a second region is generated by the second signal, and the first region and the second region are generated simultaneously. The first region is overlapped with the detection region, and the second region is overlapped with the detection region. The sensor module is overlapped with the detection region, wherein the sensor module is configured to sense a feature in the detection region.

13 Claims, 13 Drawing Sheets

(56) References Cited

U.S. PATENT DOCUMENTS

| | | | |
|---|---|---|---|
| 2006/0022909 A1* | 2/2006 | Kwak | G09G 3/3233 |
| | | | 345/76 |
| 2010/0214057 A1* | 8/2010 | Alvord | G01S 19/14 |
| | | | 340/5.2 |
| 2018/0005005 A1* | 1/2018 | He | G06F 3/0418 |
| 2019/0236162 A1* | 8/2019 | Gross | G06F 16/2477 |
| 2020/0050818 A1* | 2/2020 | He | G06V 40/1359 |
| 2020/0279090 A1* | 9/2020 | He | G06V 40/1318 |
| 2020/0380236 A1* | 12/2020 | He | G06F 3/044 |
| 2020/0395421 A1* | 12/2020 | He | H10K 59/65 |
| 2020/0409191 A1* | 12/2020 | He | G02F 1/1335 |
| 2020/0410207 A1* | 12/2020 | He | G02B 6/005 |
| 2021/0063816 A1* | 3/2021 | He | G02F 1/133615 |
| 2021/0343799 A1* | 11/2021 | Wang | H10K 59/126 |

\* cited by examiner

ELECTRONIC DEVICE

CROSS REFERENCE TO RELATED APPLICATIONS

This application is a continuation application of U.S. application Ser. No. 17/893,167, filed on Aug. 22, 2022, which is a continuation application of U.S. application Ser. No. 16/590,332, filed on Oct. 1, 2019. The contents of these applications are incorporated herein by reference.

BACKGROUND OF THE DISCLOSURE

1. Field of the Disclosure

The present disclosure relates generally to an electronic device and more particularly, to an electronic device with an optical typed sensor.

2. Description of the Prior Art

Generally, a biometric feature such as fingerprint or retina can be utilized for personal identification, and therefore, with the development of electronic devices, the function of biometric feature is also integrated in various electronic devices and widely used. Taking a display device such as smart phone as an example, the user can control the electronic device directly through the biometric feature instead of inputting password. Thus, there is still a crucial need to elevate the biometric feature function in the electronic devices for better convenience or safety.

SUMMARY OF THE DISCLOSURE

The present disclosure provides an electronic device including a detection region, wherein the electronic device includes a plurality of first units, a plurality of second units, and a sensor module. A portion of the plurality of first units is configured to generate a first signal. A portion of the plurality of second units is configured to generate a second signal, and the first signal and the second signal have different properties. When the detection region is detected, a first region is generated by the first signal, a second region is generated by the second signal, and the first region and the second region are generated simultaneously. The first region is overlapped with the detection region, and the second region is overlapped with the detection region. The sensor module is overlapped with the detection region, wherein the sensor module is configured to sense a feature in the detection region.

These and other objectives of the present disclosure will no doubt become obvious to those of ordinary skill in the art after reading the following detailed description of the embodiment that is illustrated in the various figures and drawings.

BRIEF DESCRIPTION OF THE DRAWINGS

FIG. 1 to FIG. 7 are schematic diagrams illustrating a method of detecting biometric feature with an electronic device according to a first embodiment of the present disclosure, wherein:

FIG. 1 shows a top view of an electronic device;

FIG. 2 shows a cross-sectional view taken along a cross line A-A' of FIG. 1;

FIG. 3 shows a partially enlarged view of FIG. 2;

FIG. 4 shows an enlarged view of a dotted box E in FIG. 2;

FIG. 5 shows a data scanning process of an electronic device;

FIG. 6 shows another data scanning process of an electronic device; and

FIG. 7 shows a data recording process of an electronic device.

FIG. 9 to FIG. 13 are schematic diagrams illustrating a method of detecting biometric feature with an electronic device according to a third embodiment of the present disclosure, wherein:

FIG. 9 shows a photosensor of an electronic device;

FIG. 10 shows a data scanning process of an electronic device;

FIG. 11 shows an arrangement of different color scanning lights;

FIG. 12 shows another arrangement of different color scanning lights; and

FIG. 13 shows another data scanning process of an electronic device.

DETAILED DESCRIPTION

The present disclosure may be understood by reference to the following detailed description, taken in conjunction with the drawings as described below. For purposes of illustrative clarity understood, various drawings of this disclosure show a portion of the electronic device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. In the following description and in the claims, the terms "include", "comprise" and "have" are used in an open-ended fashion, and thus should be interpreted to mean "include, but not limited to".

When an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers presented.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

The technical features in different embodiments described in the following can be replaced, recombined, or mixed with one another to constitute another embodiment without departing from the spirit of the present disclosure.

Figure 1:
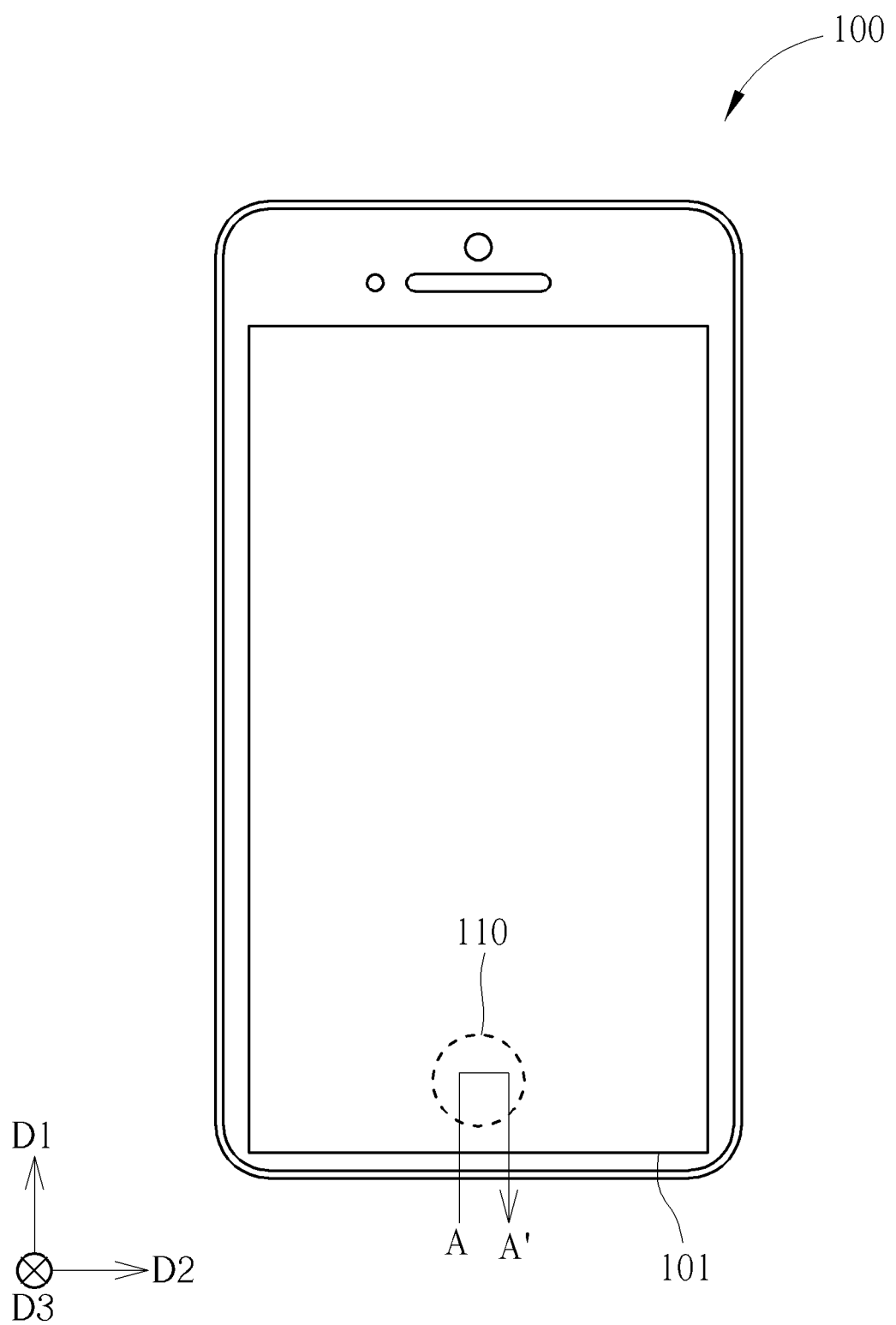
Figure 2:
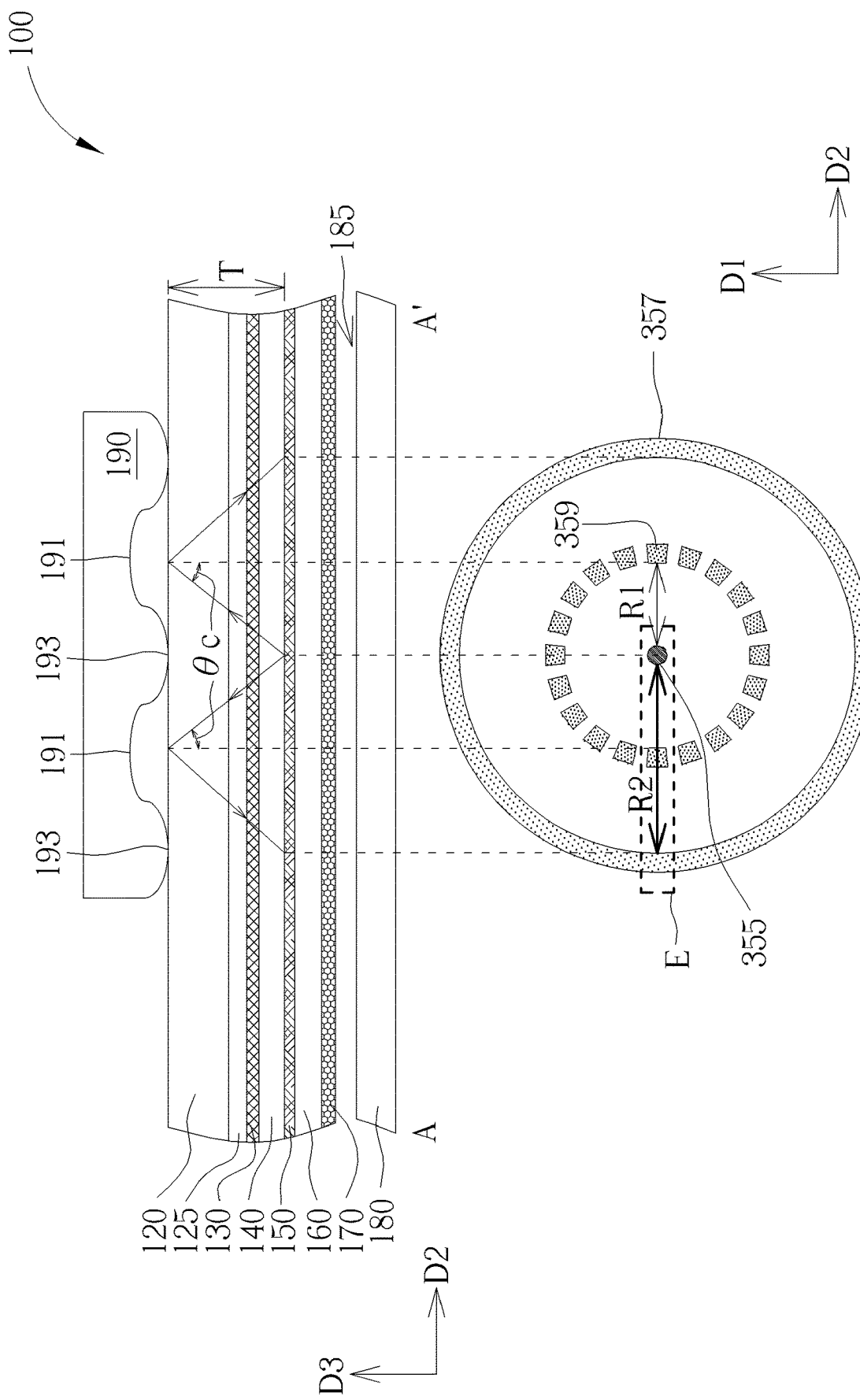

FIG. 1 to 7 illustrate a method of detecting biometric feature with an electronic device according to the first embodiment of the present disclosure, in which FIG. 1 shows a top view of an electronic device 100 and FIG. 2 shows a cross-sectional view of the electronic device 100 taken along a cross line A-A' in FIG. 1. In FIG. 1, directions D1, D2, D3 are exemplary illustrated respectively to show three different directions which are perpendicular to each other, such as a y-direction, an x-direction and a z-direction, but not limited thereto. As shown in FIG. 1, a detection region 110 is provided on the electronic device 100, for example in any suitable locations such as in a display region or a non-display region. As an example, the detection region 110 may be embedded in a home button (not shown in the drawings) or a rear side of the electronic device 100, but is not limited thereto. In the present embodiment, although the detection region 110 is illustrated as a circle shape shown in FIG. 1, the practical detection region of the present disclosure is not limited thereto and which may cover full of display region or include any suitable shape, area or further include multiple areas.

In the present embodiment, a display device is exemplified as the electronic device 100 and which includes a display region 101, and the detection region 110 is for example embedded in the display region 101. As shown in FIG. 2, the display device may further include a protective layer 120, a first polarizing layer 130, a first substrate 140, a display layer 150, a second substrate 160, a second polarizing layer 170, and a backlight source 180 sequentially disposed from top to bottom along the direction D3. In one embodiment, an adhesive layer 125 may be further disposed between the protective layer 120 and the first polarizing layer 130 for attaching the protective layer 120 onto the first polarizing layer 130 and the first substrate 140. The protective layer 120 may include a protective material like a cover glass or include polymer film, but not limited to, and the protective layer 120 may also be omitted in another embodiment. In one embodiment, an air gap 185 may be further disposed between the backlight source 180 and the second polarizing layer 170, so that, the backlight source 180 may be separately from the second polarizing layer 170 as shown in FIG. 2, but not limited thereto. The backlight source 180 may include a self-illuminating module, such as including elements of organic light emitting diodes (OLEDs) or inorganic light emitting diodes, and the inorganic light emitting diodes may be micro LED, mini LED or quantum dot LED (QLED/QDLED), but is not limited thereto. In some embodiments, the backlight source 180 may also include one or more cold cathode fluorescent lamp(s), fluorescence, phosphor, quantum dot (QD), other suitable materials or any combination thereof.

On the other hand, the display layer 150 may include a non-self-illuminating layer or a self-illuminating layer (not shown in the drawings), such as including OLEDs or inorganic light emitting diodes, and the inorganic light emitting diodes may include micro LED, mini LED or quantum dot LED, but is not limited thereto. In one embodiment, if the display layer 150 includes the self-illuminating layer, the backlight source 180 and the second polarizing layer 170, and/or the first polarizing layer 130 may be omitted thereby. Although the display layer 150 is illustrated as a single layer in FIG. 2, the display layer 150 may further include a multiple layer structure, for example, further including a display circuit layer (not shown in the drawings) having a plurality of metal lines and switch elements, or a display medium layer (not shown in the drawings) such as a liquid crystal layer, or a color filter (not shown in the drawings) or a sensor layer.

Figure 3:
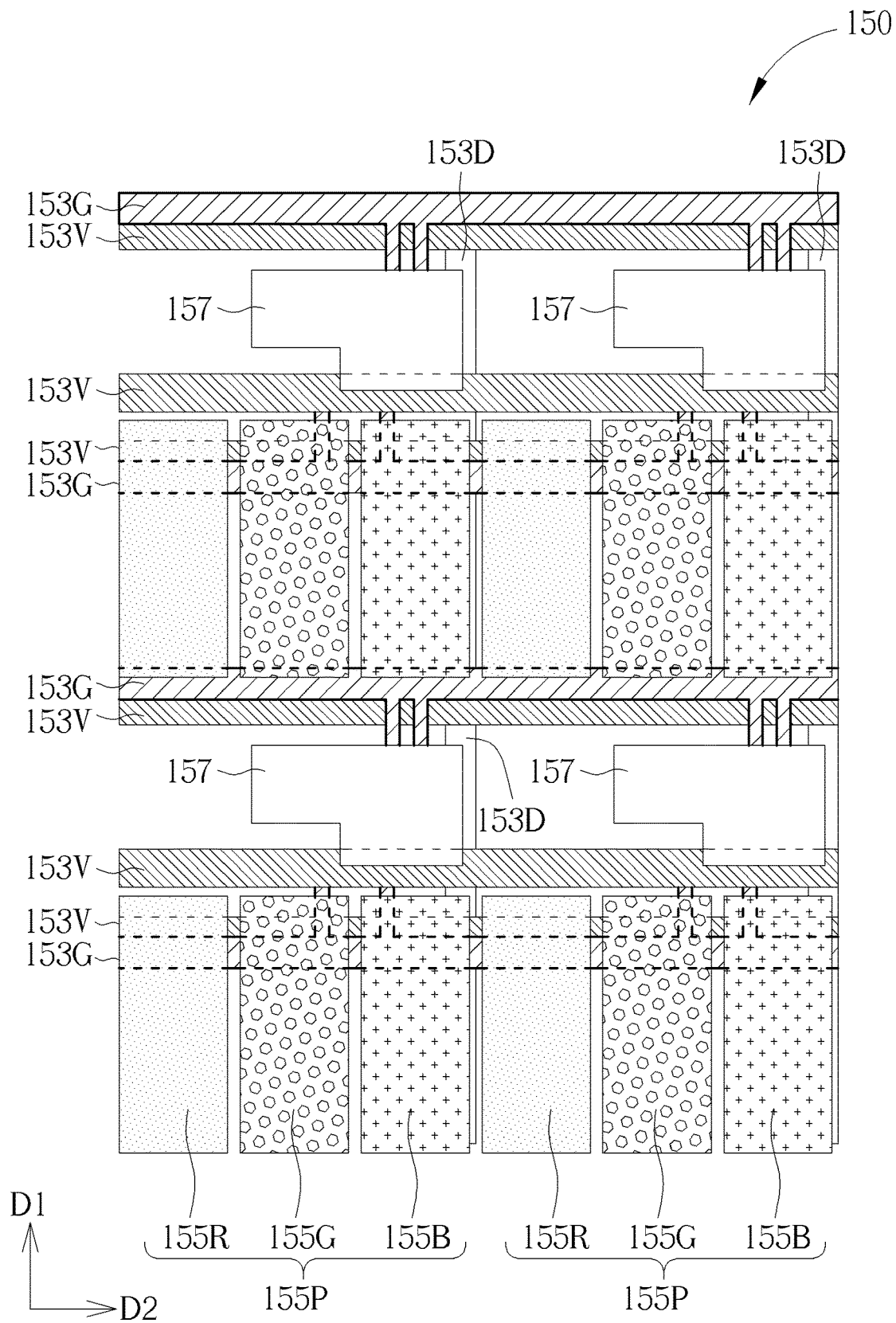

As shown in FIG. 3, the display layer 150 of the electronic device 100 may further include a plurality of pixels 155P being a minimal repeat unit of the display medium layer. Then, a plurality of power lines 153V may be disposed to extend optionally along the first direction D1 or the second direction D2, wherein the power lines 153V of the present embodiment are exemplified to extend along the second direction D2 as in FIG. 3. The display layer 150 also includes a plurality of switch elements such as thin film transistors (TFTs, not shown in the drawings), for controlling each pixel 155P and processing signals therefrom. Moreover, the display layer 150 of the present embodiment may further include the color filter disposed on each pixel 155P, and each of the pixels 155P may therefore include different color (sub) pixels, such as including a red (sub) pixels 155R, a green (sub) pixels 155G and a blue (sub) pixels 155B accordingly, but is not limited thereto. In another embodiment, each pixel 155P may also include different color quantum dot (QD) materials, fluorescent materials, phosphorescent materials, dyes or pigments to present different color (sub) pixels, but not limited thereto.

Figure 4:
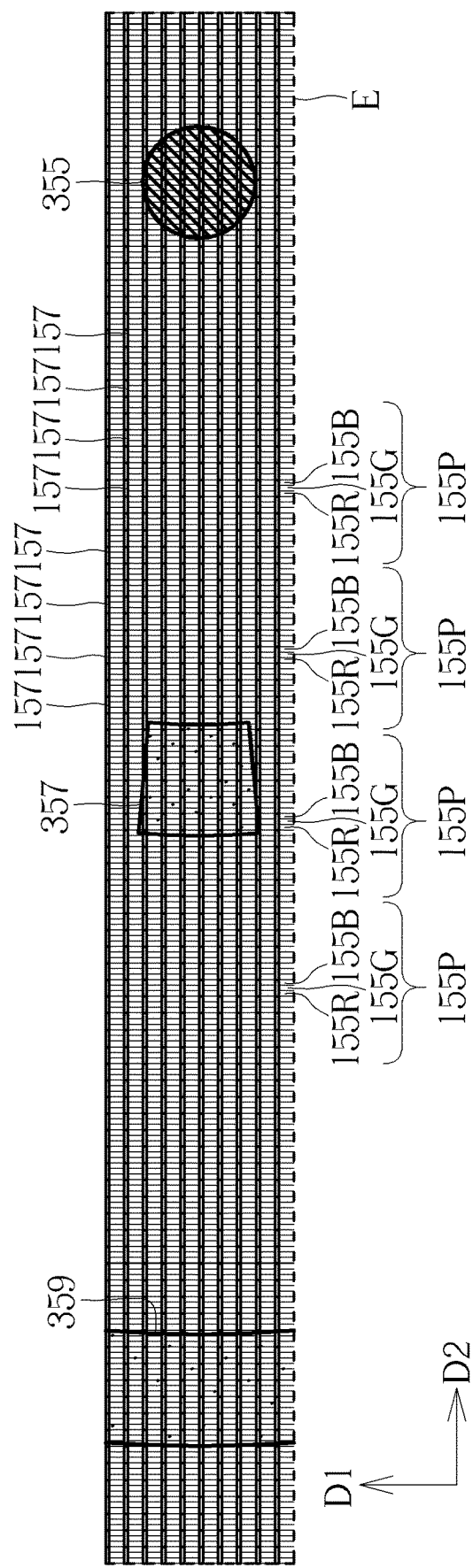

It is noted that the display layer 150 of the electronic device 100 may further include the sensor layer having a plurality of sensor units 157 such as photosensors, disposed on a portion of the power lines 153V. In another embodiment, the sensor units may be integrated into the display circuit layer, for example being formed with the switch elements. In the present embodiment, each of the sensor units 157 may be disposed in correspond with each pixel 155P as shown in FIG. 3 to FIG. 4, for sensing signals from each pixel 155P, but is not limited thereto. The sensor units 157 may also be used for sensing reflected scanning lights when detecting a biometric feature such as a fingerprint of a finger that touches the detection region 110.

As shown in FIG. 2, while a user (not shown in the drawings) puts a finger 190 on the detection region 110, a scanning light may be generated from a light spot 355 of the electronic device 100 through turning on at least one corresponding (sub) pixels 155R, 155G, 155B as shown in the enlarged view within the dotted box E in FIG. 4, for scanning the fingerprint. Precisely speaking, the light spot 355 may correspond to a portion a plurality of pixels 155P (each of the pixels 155P may include three sub pixels 155R, 155G, 155B) as shown in FIG. 4, and the scanning light provided from the light spot 355 may be generated by turning on one or more corresponding (sub) pixels. In one embodiment, each of the sub pixels 155R, 155G, 155B may be defined by a plurality of data lines 153D extended along a first direction D1 and a plurality of gate lines 153G extended along a second direction D2 crossed to the data lines 153D, but is not limited to. Also, in another embodiment, the light spot 355 of the electronic device 100 may also be provided through at least one self-illuminating module, such as the OLED or the inorganic light emitting diode, but is not limited thereto.

In the present embodiment, the corresponding (sub) pixels may be any color (sub) pixels such as the red (sub) pixels 155R, the green (sub) pixels 155G, or the blue (sub) pixels 155B. Then, as shown in FIG. 2, the scanning light of the light spot 355 are reflected by finger 190. The scanning light of the light spot 355 may be total reflected at a fingerprint valley 191 as in a critical angle δc (such as θc=42 degrees), or greater than the critical angle θc, while the refractive index of air is about 1.0 ($n_0$=1.0) and the refractive index of the protective layer 120 (such as glass) is about 1.5 ($n_1$=1.5). The critical angle θc is not limited to 42 degree and which may be vary according to various refractive indexes. On the other hands, the scanning light of the light spot 355 reflected at a fingerprint ridge 193 may have diffused reflectance signals. Through this way, a clear fingerprint image with a higher resolution or a higher contract ratio (CR) may be obtained by mainly detecting the scanning lights reflected by the total reflection (valley=bright, ridge=dark) on the sensor units 157.

In the present embodiment, the scanning light of the light spot 355 reflected by the total reflection is then sensed as a sensing area 357 by the sensor units 157, as shown in FIG. 2 and FIG. 4. Next, a target area 359 (namely the real position of fingerprint valley 191) may therefore be obtained and recorded by calculating a distance "R1" between the target area 359 and the light spot 355 via the following formula. People in the art should fully understand that although the target area 359 and the sensing area 357 are all illustrated in a ring shape or like a ring shape, the practical embodiment thereof is not limited thereto. Formula: "R1"="T" *{sin θc/cos θc}; "R2"=2*"R1" (R1: a distance between the light spot and the target area 359; R2: a distance between the light spot and the sensing area 357; T: a thickness between a top surface of the protective layer 120 and a top surface of the display layer 150)

Figure 5:
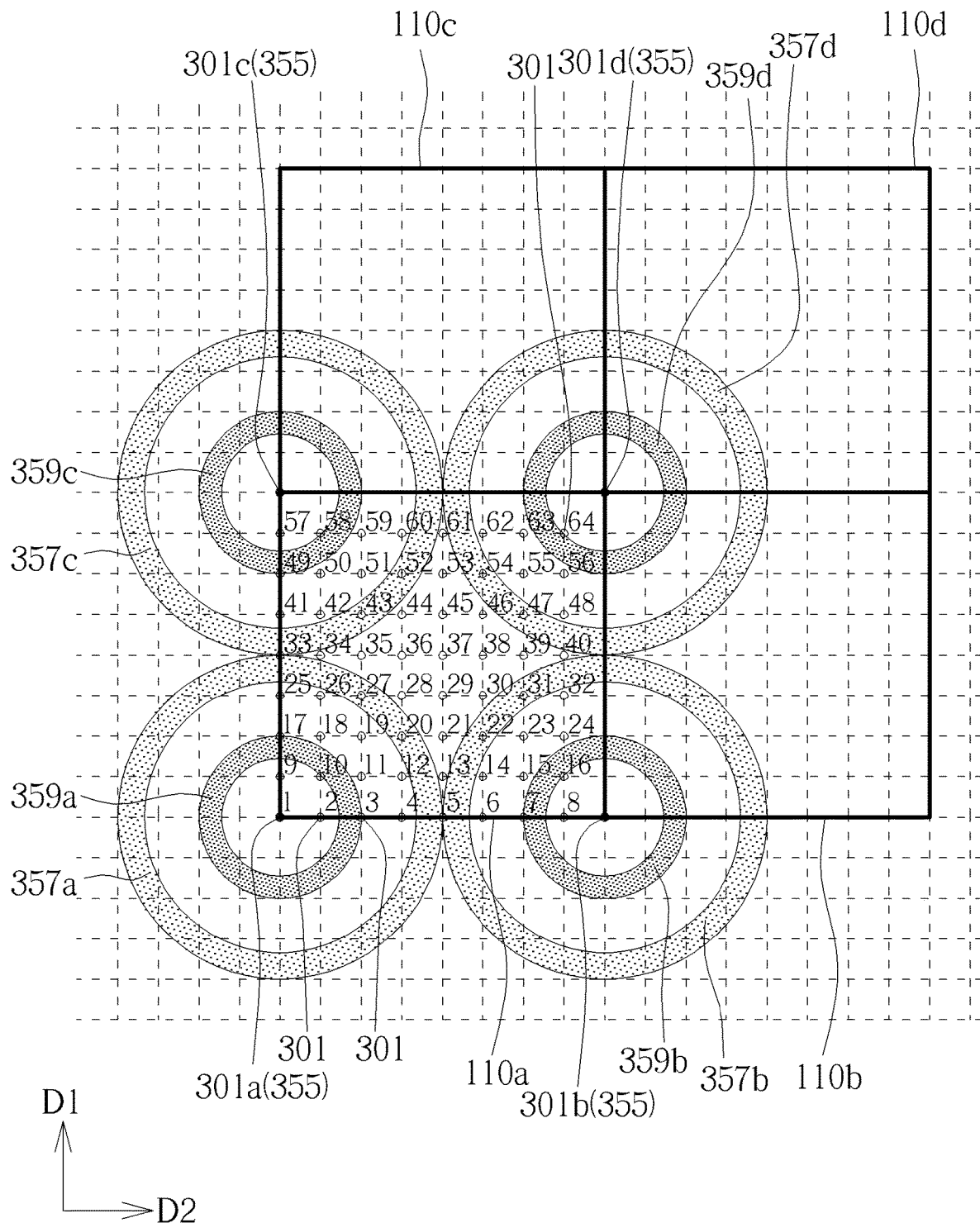

It is noteworthy that, while detecting the fingerprint of the portion of the whole finger 190 on the detection region 110, a scanning process is firstly performed by sequentially turning on a plurality of the light spots 355, and the scanning lights generated from each light spot 355 may have any suitable color, such as red, blue or green, but not limited thereto. As shown in FIG. 5, the detection region 110 may be split into a plurality of scan blocks 110a, 110b, 110c, 110d, and each scan block 110a, 110b, 110c, 110d may be in any possible size based on a requirement resolution of the fingerprint image. The number and the size of the scan blocks 110a, 110b, 110c, 110d shown in FIG. 5 are only for example, and which may be further modified in other embodiment base on practical requirements. Next, each of the scan blocks 110a, 110b, 110c, 110d may be further separated into a x*y matrix for defining a plurality of light scanning positions (namely the positions of light spot 355) for providing the scanning lights, in which "x" and "y" may be any constant greater than zero and "x" may be optionally the same or different from "y". For example, if the scan block 110a is separated into an 8*8 matrix as shown in FIG. 5, and 64 scanning positions 301a, 301 (being marked as numbers 1 to 64 in FIG. 5) are defined for example at a bottom left corner of each square of the 8*8 matrix for sequentially providing 64 light spots, but are not limited thereto. In another embodiment, the scan block may also be split into a 7*7 matrix, a 6*6 matrix or a 5*5 matrix, based on a required resolution of the fingerprint image, and also, each scanning position of the matrix may also be disposed at any other corners of each square.

As shown in FIG. 5, the light spots 355 are sequentially turned on for example from the $1^{st}$ scanning position 301a, 301b, 301c, 301d of each scan block 110a, 110b, 110c, 110d to the $64^{th}$ scanning position 301 of each scan block 110a, 110b, 110c, 110d. In FIG. 5, only the 64 scanning positions 301a, 301 in the scan block 110a and the $1^{st}$ scanning positions 301b, 301c, 301d in the scan blocks 110b, 110c, 110d are illustrated as black spots, with the scanning positions (such as the $1^{st}$ scanning positions 301a, 301b, 301c, 301d of the scan blocks 110a, 110b, 110c, 110d) that instantly provide the light spots 355 being illustrated as solid black spots, and with the scanning positions (such as the $2^{nd}$, $3^{rd}$ . . . to $64^{th}$ scanning positions 301 of the scan block 110a) that do not instantly provide the light spots 355 being illustrated as hollow black spot. Also, all the scanning lights generated from the $1^{st}$ scanning positions 301a, 301b, 301c, 301d of each scan block 110a, 110b, 110c, 110d are in the same color, but is not limited thereto.

In the present embodiment, the light spots 355 are simultaneously provided from the $1^{st}$ scanning position 301a, 301b, 301c, 301d of each scan block 110a, 110b, 110c, 110d at first, to generate corresponding sensing areas 357a, 357b, 357c, 357d on the sensor units 157 (as shown in FIG. 3 to 4) and then to generate corresponding target areas 359a, 359b, 359c, 359d. After obtaining signals of the sensing areas 357a, 357b, 357c, 357d and the target areas 359a, 359b, 359c, 359d, the light spots 355 are next provided from the $2^{nd}$ scanning position 301 of each scan block 110a, 110b, 110c, 110d (not showing the scanning lights from the $2^{nd}$ scanning position 301 in FIG. 5) to obtain corresponding signals, followed by sequentially providing light spots 355 at the $3^{rd}$ scanning position 301 . . . to the $64^{th}$ scanning position 301 of each scan block 110a, 110b, 110c, 110d in order. However, in another embodiment, the light spots 355 may also be turned on in different order, for example from the $64^{th}$ scanning position 301 to the $1^{st}$ scanning position 301a, 301b, 301c, 301d of each scan block 110a, 110b, 110c, 110d, but is not limited thereto.

Please note that, the sensing areas 357a, 357b, 357c, 357d simultaneously generated from the $1^{st}$ scanning position 301a, 301b, 301c, 301d of each scan block 110a, 110b, 110c, 110d may not be overlapped with each other, in order to clearly identify the scanning data from each scanning light (also known as each light spot 355) at a particular ordered scanning positions 301 of different scan blocks 110a, 110b, 110c, 110d. It is also noted that, all the target areas 359 generated by all the scanning positions 301 within one scan block such as the scan block 110a may cover the whole area thereof, so as to recognize all features or patterns of the finger 190 pressed on said one scan block (such as the scan block 110a).

Figure 6:
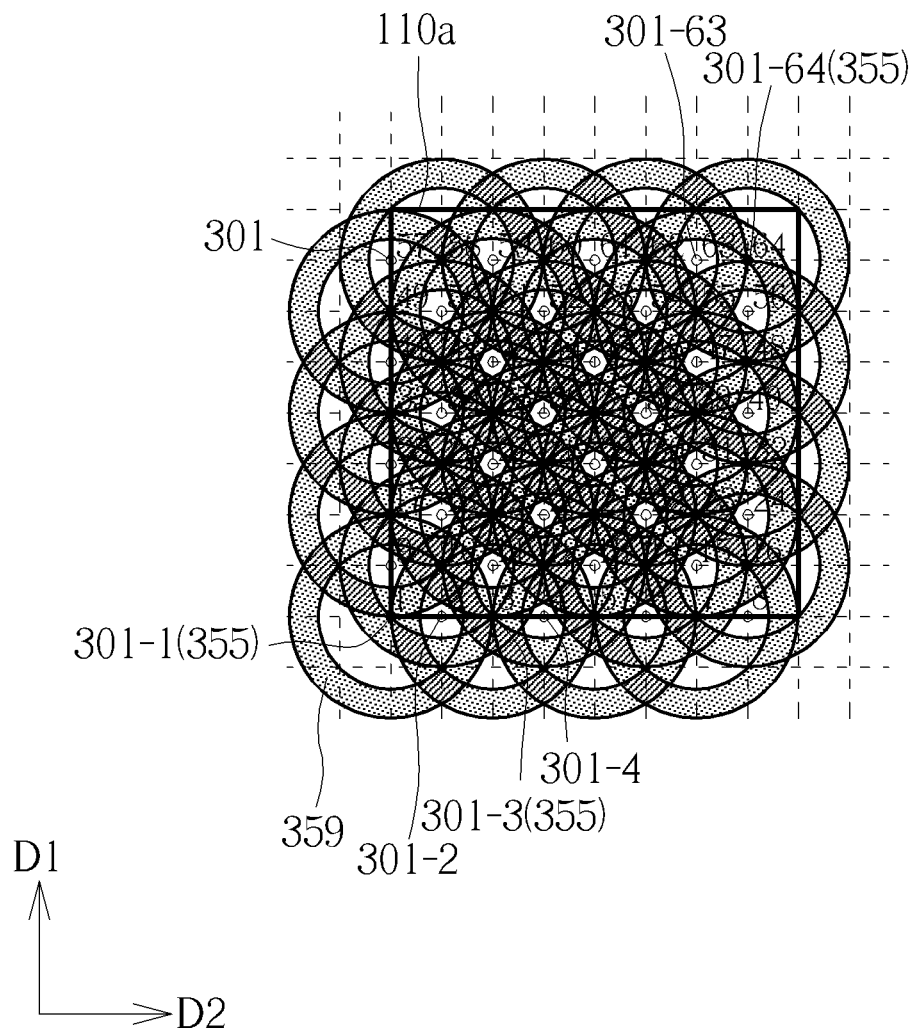

In some situations as shown in FIG. 6, if the sensing areas 357 (not shown in FIG. 6) generated from adjacent scanning positions (such as the $1^{st}$ scanning position 301-1 and the $2^{nd}$ scanning position 301-2) within a same scan block such as the scan block 110a may be partially overlapped, only a part of the light spots 355 of the adjacent scanning positions 301 within the same scan block may be turned on for light scanning. In FIG. 6, the scanning positions (such as the $1^{st}$ scanning positions 301-1, the $3^{rd}$ scanning position 301-3 and the $64^{th}$ scanning position 301-64) that are intended to provide the light spots 355 are illustrated as solid black spots, and the scanning positions (such as the $2^{nd}$ scanning positions 301-2, the $4^{th}$ position 301-4, and the $63^{rd}$ scanning position 301-63) that are not intended to provide the light spots 355 are illustrated as hollow black spot. Accordingly, the light spot 355 of a part of the scanning positions such as the $2^{nd}$ scanning position 301-2 may be optionally turned off, and the total number of the light spots 355 turned on in the scan block 110a may be reduced, for example from 64 light spots 355 to 32 light spots 355 (at the $1^{st}$, $3^{rd}$, $5^{th}$, $7^{th}$, $10^{th}$, $12^{th}$, $14^{th}$, $16^{th}$, $17^{th}$, $19^{th}$, $21^{st}$, $23^{rd}$, $26^{th}$, $28^{th}$, $30^{th}$, $32^{nd}$, $33^{rd}$, $35^{th}$, $37^{th}$, $39^{th}$, $42^{nd}$, $44^{th}$, $46^{th}$, $48^{th}$, $49^{th}$, $51^{st}$, $53^{rd}$, $55^{th}$, $58^{th}$, $60^{th}$, $62^{nd}$, and $64^{th}$ scanning positions 301 respectively) to generate corresponding target areas 359 and sensing areas 357 (not shown in FIG. 6). In such performance, the scanning pitch between each light spot 355 is increased and the scanning time may be sufficiently saved.

However, please also note that, even the number of the light spots 355 turned on within one scan block such as the scan block 110a may be reduced, the target areas 359 generated by all the light spots 355 of the remaining scanning positions 301 still have to cover the whole area of the scan block 110a, as shown in FIG. 6, so as to make sure all features and patterns within the scan block 110a being recognized. In another embodiment, the total number of the light spots 355 within one scan block (such as the scan block 110a) may not be reduced in half (for example: from 64 to 32), and a less number or a more number of light spots 355 may also be optionally turned on or turned off between any adjacent scanning positions 301 based on the required resolution of the of the fingerprint image.

Figure 7:
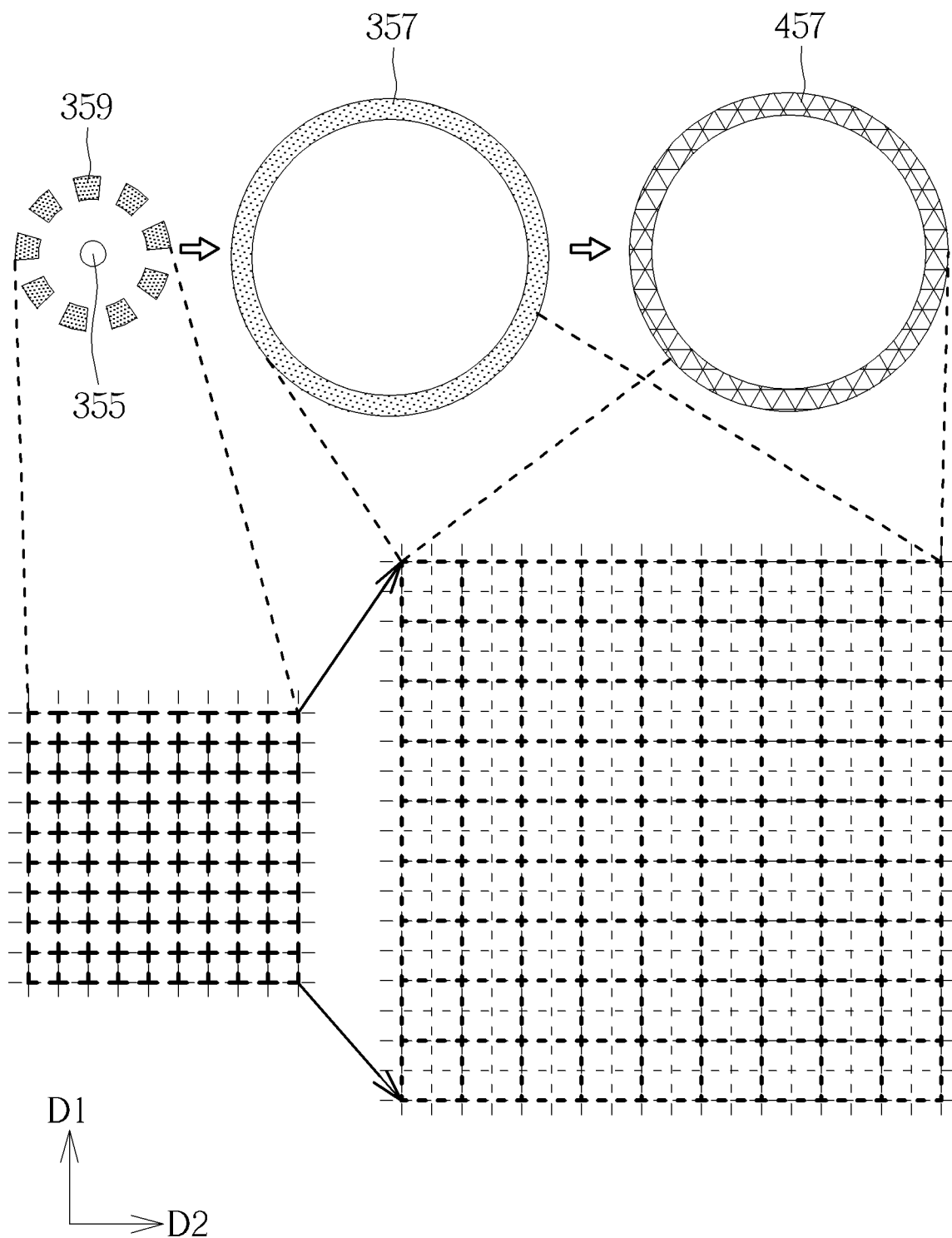

After that, a recording process is performed by recording the light scanning data obtained from each light spot 355. Precisely speaking, as shown in FIG. 7, after the sensing area 357 is obtained on the sensor units 157 (not shown in FIG. 7), a corresponding signal may be generated by the sensor units 157 according to the sensing area 357. In the present embodiment, the diameter of each of the sensing areas 357 (also known as the distance R2 shown in FIG. 2) is about two times greater than the diameter of the target areas 359 (also known as R1 shown in FIG. 2) as reference to the above formula ("R2"=2*"R1"), and the corresponding signal of the sensing area 357 may be directly outputted as a data matrix format 457. For example, the data number or the data area of the target area 359 may be shown as a left matrix in FIG. 7 with each thick-lined frame of the left matrix presenting each data area and with each thin-lined frame of the left matrix presenting each data number, and the data number or the data area of the sensing area 357 may be shown as a right matrix in FIG. 7 with each thick-lined frame of the right matrix presenting each data area and with each thin-lined frame of the right matrix presenting each data number. As an example, each data (also known as the data presented by each thin-lined frame) of the left matrix may present the signals obtained from each pixel 155P (not shown in FIG. 7) of the left matrix, and each data (also known as the data presented by each thin-lined frame) of the right matrix may present the signal obtained from two pixels 155P in one direction (such as the direction D1 or direction D2), which is about two times greater than that of the left matrix. Thus, through these recording, while directly record the data matrix format 457 from the sensing area 357, a greater number or a greater area of data are recorded to determine the fingering image, so as to improve the quality of the fingering image. Also, through these recording, the data of the sensing areas 357 may be directly recorded without firstly calculating the target area by the above formula, and the recording time may be saved thereby.

In summary, through the method of detecting the biometric feature with the electronic device 100 in the present embodiment, a light spot 355 at a scanning position 301 of each of the plurality of scan block 110a, 110b, 110c, 110d is firstly turned on to generate a scanning light, and the scanning light is reflected by the pattern or the feature of a biometric object such as fingerprint. Next, the reflected scanning light is detected on a sensor unit 157 to generate a corresponding sensor area as a signal, and then, the signal is recorded as a target in a data format (as shown in FIG. 7). As following, another light spot 355 at another scanning position 301 is turned on subsequently, to repeat the light scanning and recording processes above. After that, all of the targets are integrated and calculated by the above formula to determining the fingerprint image. In the present method, a clear fingerprint image with a higher resolution or a higher contract ratio may be obtained by sensing the total reflection signals reflected from the fingerprint valleys, so that, the possibly diffused reflectance caused by moisture or other interferences on the fingerprint ridge 193 may be reduced. Therefore, the low contract ratio issue or image blur problem that is frequently occurred on a general fingerprint sensor module may be improved.

Although the method of the present embodiment is mainly exemplified by detecting fingerprint, the practical application of the present disclosure is not limited thereto and may be widely used in any fingerprint sensor modules or other biometric feature sensor modules. People in the art should easily realize that the detecting method of the present disclosure may also be used on detecting any biometric feature, such as lip line, face or other suitable features having ridges and valleys.

The following description will detail the different embodiments of the detecting method of the present disclosure. To simplify the description, the following description will detail the dissimilarities among the different embodiments and the identical features will not be redundantly described. In order to compare the differences between the embodiments easily, the identical components in each of the following embodiments are marked with identical symbols.

Figure 8:
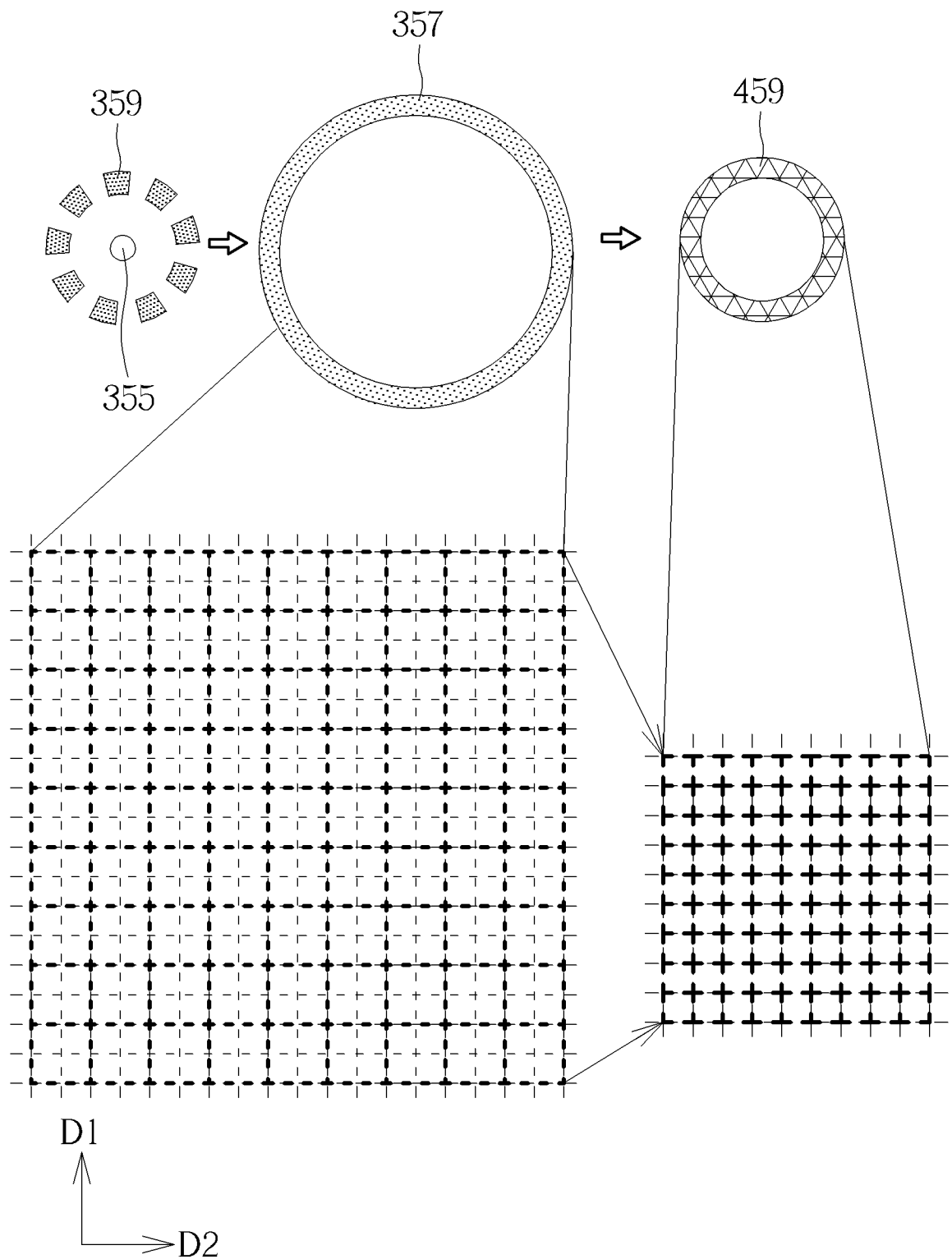
FIG. 8 is a schematic diagram illustrating a method of detecting biometric feature with an electronic device according to a second embodiment of the present disclosure.

Please refer to FIG. 8, illustrating a method of detecting biometric feature with an electronic device according to a second embodiment of the present disclosure. The method of the present embodiment is substantially the same as that of the first embodiment, and the similarities thereof will not be redundantly described hereinafter. The difference between the present embodiment and the aforementioned first embodiment is that the data number or the data area of the sensing area 357 may be compressed before recording, and/or a data matrix format 459 may be recorded based on the target area 359 instead of the sensing area 357.

In the present embodiment, after the sensing area 357 is obtained on the sensor units 157, a corresponding signal may also be generated by the sensor units 157 according to the sensing area 357, and then, the corresponding signal is compressed by smoothing and/or sampling the data of the sensing area 357, as shown in FIG. 8. In one embodiment, the smoothing and/or sampling the data may be accomplished by picking up a part of the data number or the data area according to the sensing area 357, or decreasing the data number or the data area according to the sensing area 357, but is not limited thereto. In another embodiment, the smoothing and/or sampling the data may also be accomplished by taking the average of data number or the data area according to the sensing area 357, or cutting of the maximum data or the minimum data. Accordingly, after compressing the data, the data number or the data area for example as shown as a left matrix in FIG. 8 may be shrunk into a small size as shown as a right matrix shown in FIG. 8, and the compressed data is outputted as the data matrix format 459. Meanwhile, before recording, the corresponding signal may be calculated by the above formula to obtain the target area 359 based on the sensing area 357. Through these recording, the data matrix format 459 may be recorded according to the target area 359 and/or the compressed data, and a small data number or a small data area is recorded to determine the fingering image, so as to save storage spaces. Also, since the data matrix format 459 is already calculated to the target area 359, the subsequent fingerprint determining process may be fast and easy.

Please refer to FIG. 9 to 12, illustrating a method of detecting biometric recognition with an electronic device according to a third embodiment of the present disclosure. The method of the present embodiment is substantially the same as that of the first embodiment, and the similarities thereof will not be redundantly described hereinafter. The difference between the present embodiment and the aforementioned embodiments is that different color (sub) pixels may be turned on either simultaneously or sequentially in the scanning process of the present embodiment, to generate different color scanning lights such as red color, green color or blue color. The different color (sub) pixels such as the red (sub) pixels 155R, the greed (sub) pixels 155G or the blue (sub) pixels 155B may be optionally used based on the type or the materials of the sensor units 157. For example, the red (sub) pixels 155R may be used on an organic photo diode to obtain a better response, but is not limited thereto.

Figure 9:
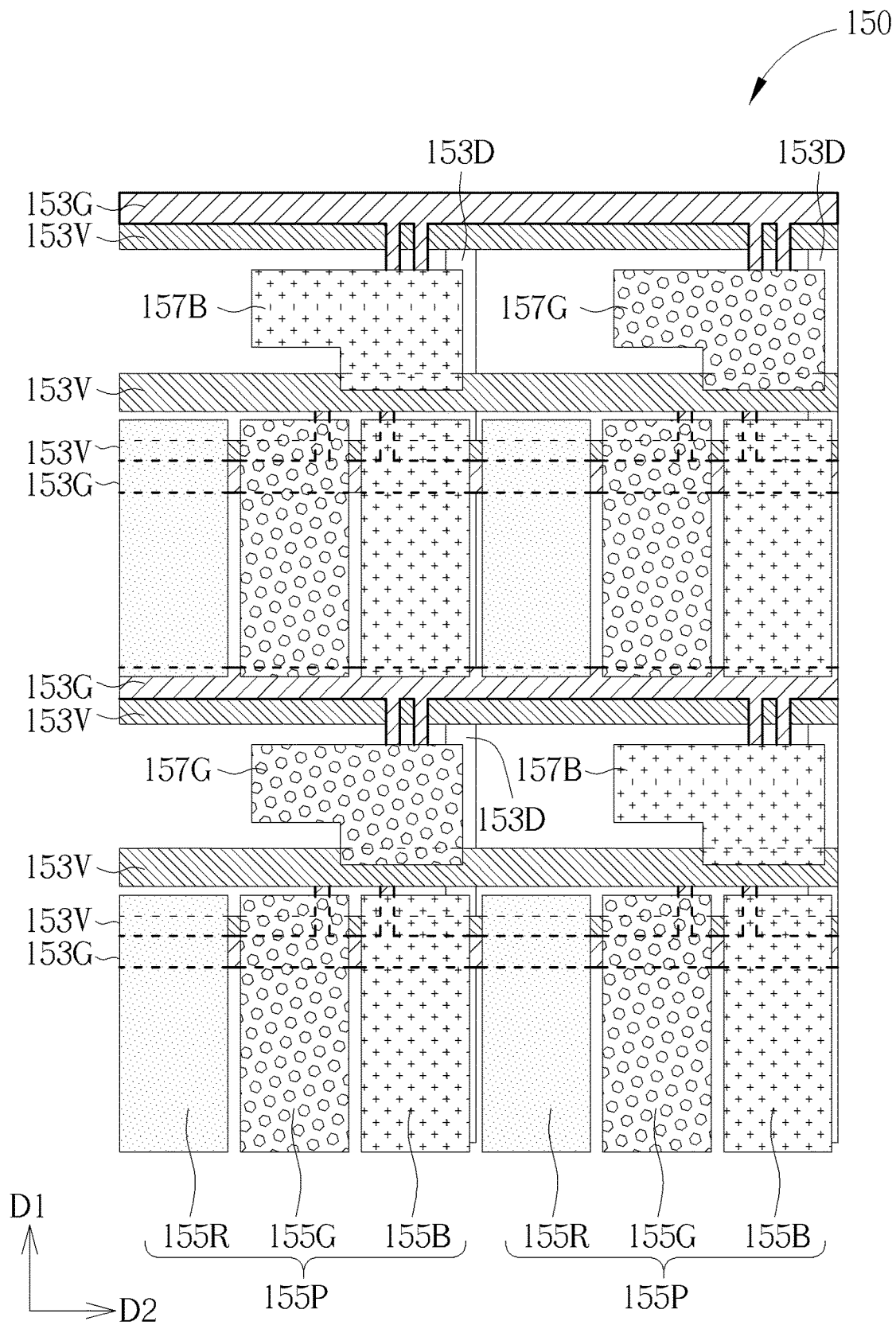

While detecting the fingerprint within the detection region 110 in the present embodiment, a scanning process is firstly performed. Similar to the aforementioned embodiment, the scanning process of the present embodiment is performed by sequentially generating different color scanning lights from different color light spots 355B, 355G. The different color scanning lights may be generated by respectively turning on at least a portion of the plurality of corresponding (sub) pixels with different colors, or at least one self-illuminating module, for scanning the fingerprint. As shown in FIG. 9, while using the (sub) pixels with different colors, the plurality of sensor units 157B, 157G in the display layer 150 of the electronic device 100 in the present embodiment may additionally include a plurality of different colored color filters (not shown in the drawings) disposed thereon to sense corresponding color scanning lights. For example, in the present embodiment, the sensor units 157G may further include a plurality of green color filters, and the sensor units 157B may further include a plurality of blue color filters to respectively sense a plurality of green color scanning lights and a plurality of blue color scanning lights, but is not limited thereto. In another embodiment, the sensor units may further include red color filters, or any other color filter to sense red color scanning lights or any other color scanning lights.

Figure 10:
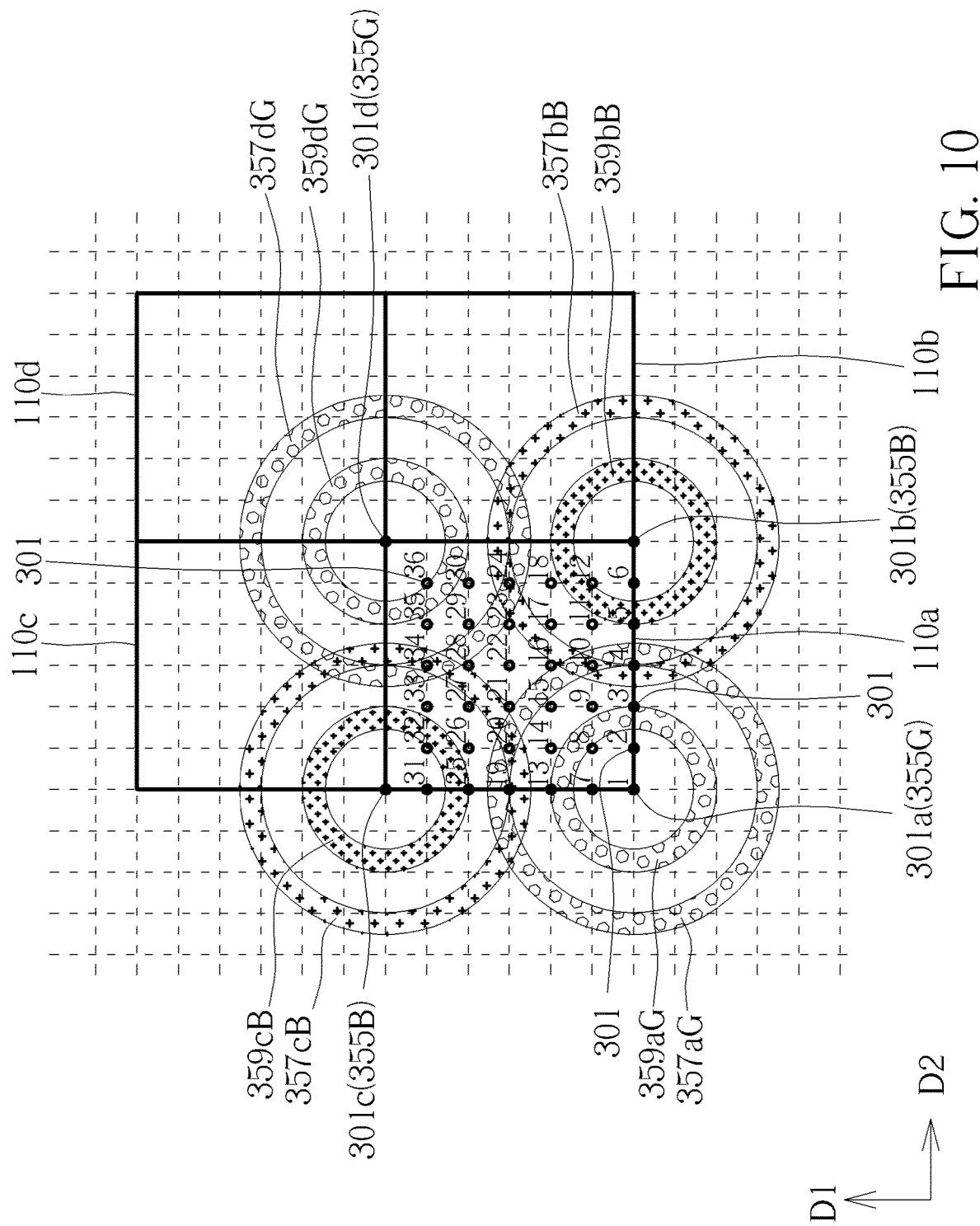

As shown in FIG. 10, light spots 355G, 355B with green color and blue color respectively may be turned on from 36 scanning positions 301 of each scan block 110a, 110b, 110c, 110d in an order in the present embodiment, for example also from the 1$^{st}$ scanning position 301a, 301b, 301c, 301d of each scan block 110a, 110b, 110c, 110d to the 36$^{th}$ scanning position 301 of each scan block 110a, 110b, 110c, 110d. In FIG. 10, only the 36 scanning positions 301a, 301 in the scan block 110a and the 1$^{st}$ scanning positions 301b, 301c, 301d of the scan blocks 110b, 110c, 110d are illustrated as black spots, with the scanning positions (such as the 1$^{st}$ scanning positions 301a, 301b, 301c, 301d of the scan blocks 110a, 110b, 110c, 110d) that instantly provide the light spots 355G, 355B being illustrated as solid black spots, and with the scanning positions (such as the 2$^{nd}$, 3$^{rd}$ ... 36$^{th}$ scanning position 301 of the scan block 110a) that do not instantly provide the light spots 355G, 355B being illustrated as hollow black spot.

As shown in FIG. 10, the light spots 355G with the green color are simultaneously provided from the 1$^{st}$ scanning position 301a, 301d of each scan block 110a, 110d at first, to generate corresponding sensing areas 357aG, 357dG, on the sensor units 157G (as shown in FIG. 9) and then to generate corresponding target areas 359aG, 359dG. Meanwhile, the light spots 355B with the blue color are also simultaneously provided from the 1$^{st}$ scanning position 301b, 301c of each scan block 110b, 110c, to generate corresponding sensing areas 357bB, 357cB, on the sensor units 157B (as shown in FIG. 9) and then to generate corresponding target areas 359bB, 359cB. It is noted that, the scanning light generated from a scanning position of one scan block such as the 1$^{st}$ scanning position 301a of the scan block 110a, and another scanning light generated from other scan blocks (such as the scan blocks 110b, 110c) adjacent to the scan block 110a at the same time may have different colors as shown in FIG. 10, so that the sensing areas 357aG, 357cB and 357bB, and the target areas 359aG, 359cB and 359bB, are also in different colors for easy recognition. It is also noted that, the sensing areas 357aG, 357bB, or the sensing areas 357aG, 357cB, simultaneously generated from the light spots 355G, 355B with different colors at the 1$^{st}$ scanning positions 301a, 301b, 301c of the two adjacent scan blocks 110a, 110b or 110a, 110c may be optionally overlapped with each other in the present embodiment, because the sensing areas 357ag, 357bb, or the sensing areas 357aG, 357cB, are respectively sensed by the sensor units 157G, 157B also with different colors for clear identification. While the sensing areas 357aG, 357cB simultaneously generated from the light spots 355G, 355B at the 1$^{st}$ scanning positions 301a, 301b, 301c of the two adjacent scan blocks 110a, 110b or 110a, 110c are allowed to be overlapped with each other, the minimal scanning pitch between each light spots 355G, 355B in the present embodiment may be further reduced to gain a better resolution for the fingerprint image.

After obtaining the signals of the sensing areas 357ag, 357bb, 357cb, 357dg and the target areas 359aG, 359bB, 359cB, 359dG, the light spots 355B, 355G are next provided from the 2$^{nd}$ scanning position 301, the 3$^{rd}$ scanning position 301 . . . to 36$^{th}$ scanning position 301 of each scan block 110a, 110b, 110c, 110d in order.

Figure 11:
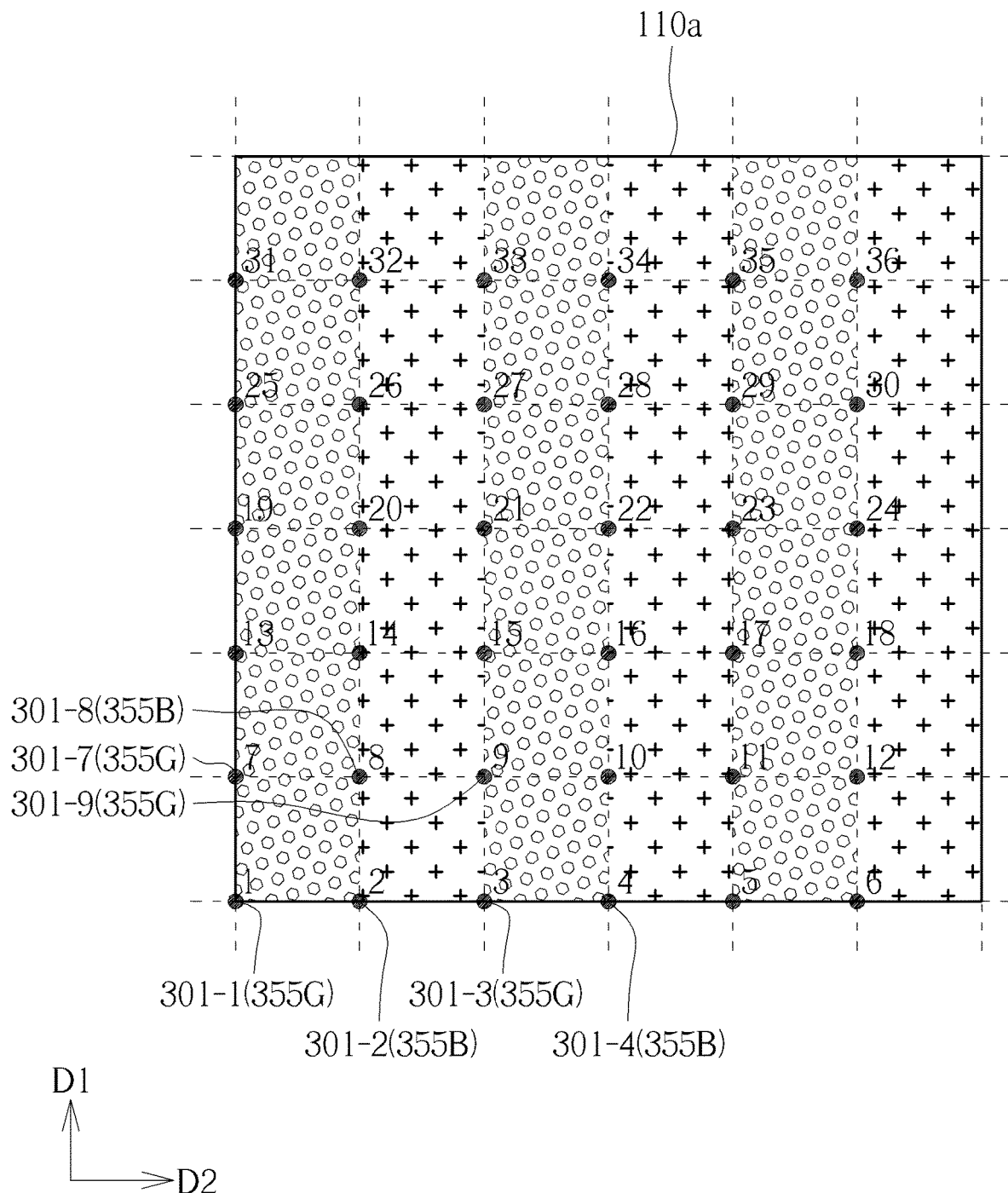
Figure 12:
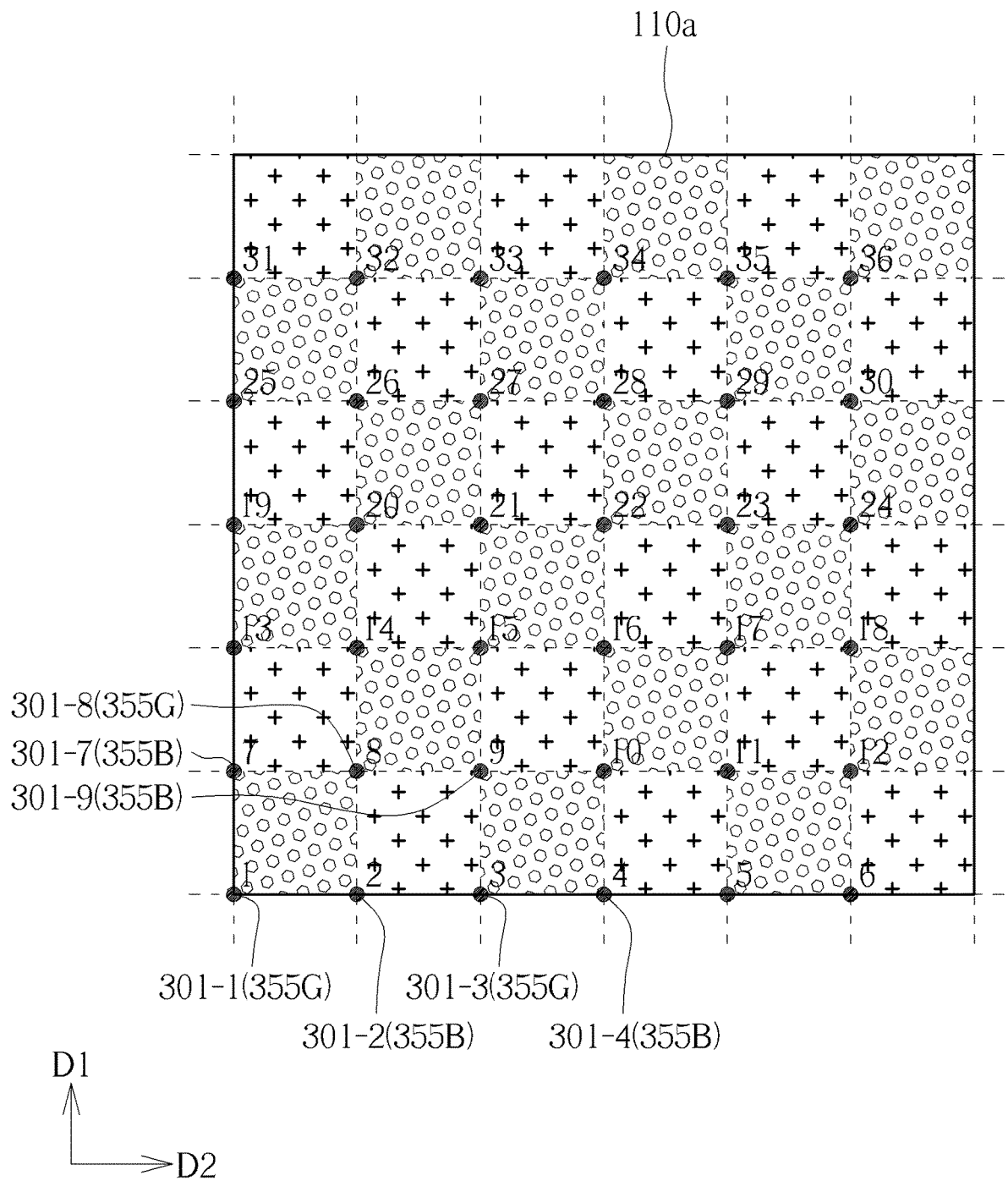

As shown in FIG. 11 and FIG. 12, the scanning lights generated from two adjacent scanning positions 301 such as the 1$^{st}$ scanning position 301-1 and the 2$^{nd}$ scanning positions 301-2 within the same scan block such as the scan block 110a may also have different colors, such as green and blue, so as to obtain the sensing areas and the target areas (not shown in FIG. 11 to 12) with green and blue colors. In FIG. 11 to 12, different shadings of each square are only used to present different color scanning lights intended to generate by different color light spots at different scanning positions 301 in order, instead of showing the sensing areas or the target areas, or showing all the scanning lights being generated from all the scanning positions at the same time.

As shown in FIG. 11, the different color light spots 355G, 355B are disposed at adjacent scanning positions 301 in one direction such as the direction D2. Precisely speaking, while the 1$^{st}$ scanning position 301-1 of the scan block 110a for example provides a green color light spot 355G, the 2$^{nd}$ scanning position 301-2 of the scan block 110a adjacent to the 1$^{st}$ scanning position 301-1 in the direction D2 may provide a blue color light spot 355B, the 3$^{rd}$ scanning position 301-3 of the scan block 110a adjacent to the 2$^{nd}$ scanning position 301-2 in the direction D2 may provide another green color light spot 355G, the 4$^{th}$ scanning position 301-4 of the scan block 110a adjacent to the 3$^{rd}$ scanning position 301-3 of the scan block 110a in the direction D2 may provide another blue color light spot 355B, and so on. On the other hand, the 7$^{th}$ scanning position 301-7 of the scan block 110a adjacent to the 1$^{st}$ scanning position 301-1 in the direction D1 may also provide a green color light spot 355G, the 8$^{th}$ scanning position 301-8 of the scan block 110a adjacent to the 7$^{th}$ scanning position 301-7 in the direction D2 may provide a blue color light spot 355B, the 9$^{th}$ scanning position 301-9 of the scan block 110a adjacent to the 8$^{th}$ scanning position 301-8 in the direction D2 may provide a green color light spot 355G, and so on.

However, in another embodiment, the 1$^{st}$ scanning position 301-1 or the 7$^{th}$ scanning position 301-7 may also provide a blue color light spot (not shown in the drawings) and the 2$^{nd}$ scanning position 301-2 or the 8$^{th}$ scanning position 301-8 adjacent to the 1$^{st}$ scanning position 301-1 or the 7$^{th}$ scanning position 301-7 in the direction D2 may provide a green color light spot (not shown in the drawings), or the adjacent scanning positions in direction D1 provide different colors (not shown in the drawings). Accordingly, all the green color light spots 355G and all the blue color light spots 355B within the same scan block 110a may arrange in a strip interlaced arrangement as shown in FIG. 11, with all the green light spots 355G or all the blue light spots 355B arranged in a plurality of columns along the direction D1, and also, in another embodiment, all the green light spots 355G or all the blue light spots 355B may also be arranged in a plurality of rows along the direction D2 (not shown in the drawings).

As shown in FIG. 12, the different color light spots 355G, 355B are disposed at adjacent scanning positions 301 in two directions such as the direction D1 and the direction D2. Precisely speaking, while the 1$^{st}$ scanning position 301-1 of the scan block 110a for example provides a green color light spot 355G, the 2$^{nd}$ scanning position 301-2 of the scan block 110a adjacent to the 1$^{st}$ scanning position 301-1 in the direction D2 may provide a blue color light spot 355B, the 3$^{rd}$ scanning position 301-3 of the scan block 110a adjacent to the 2$^{nd}$ scanning position 301-2 in the direction D2 may provide another green color light spot 355G, the 4$^{th}$ scanning position 301-4 of the scan block 110a adjacent to the 3$^{rd}$ scanning position 301-3 of the scan block 110a in the direction D2 may provide another blue color light spot 355B, and so on. Likewise, the 7$^{th}$ scanning position 301-7 of the scan block 110a adjacent to the 1$^{st}$ scanning position 301-1 in the direction D1 may provide another blue color light spot 355B, the 8$^{th}$ scanning position 301-8 of the scan block 110a adjacent to the 7$^{th}$ scanning position 301-7 in the direction D2 may provide a green color light spot 355G, the 9$^{th}$ scanning position 301-9 of the scan block 110a adjacent to the 8$^{th}$ scanning position 301-8 in the direction D2 may provide another blue color light spot 355B, and so on.

However, in another embodiment, the 1$^{st}$ scanning position 301-1 may also provide a blue color light spot (not shown in the drawings), and the 2$^{nd}$ scanning position 301-2 or the 7$^{th}$ scanning position 301-7 adjacent to the 1$^{st}$ scanning position 301-1 in the direction D2 or the direction D1 may provide a green color light spot 355G (not shown in the drawings)). Accordingly, all the green color light spots 355G and all the blue color light spots 355B within the same scan block 110a may arrange in a mosaic arrangement, as shown in FIG. 12. Then, all the target areas (not shown in FIG. 12) generated by all the scanning positions 301 within the same scan block 110a still have to cover the whole area within the scan block 110a.

Please noted that, although the different color light spots 355G, 355B may be arranged in the strip interlaced arrangement or in the mosaic arrangement, the sensor units 157G, 157B having different color filters disposed thereon in the present embodiment are not limited to have similar arrangement. In one embodiment, the sensor units 157G, 157B having different color filters may be arranged in a mosaic arrangement (as shown in FIG. 9), and in another embodiment, the sensor units may also be arranged in strip arrangement with different colored sensor units 157G, 157B arranged in columns or in rows (not shown in the drawings), or any other suitable arrangements.

Figure 13:
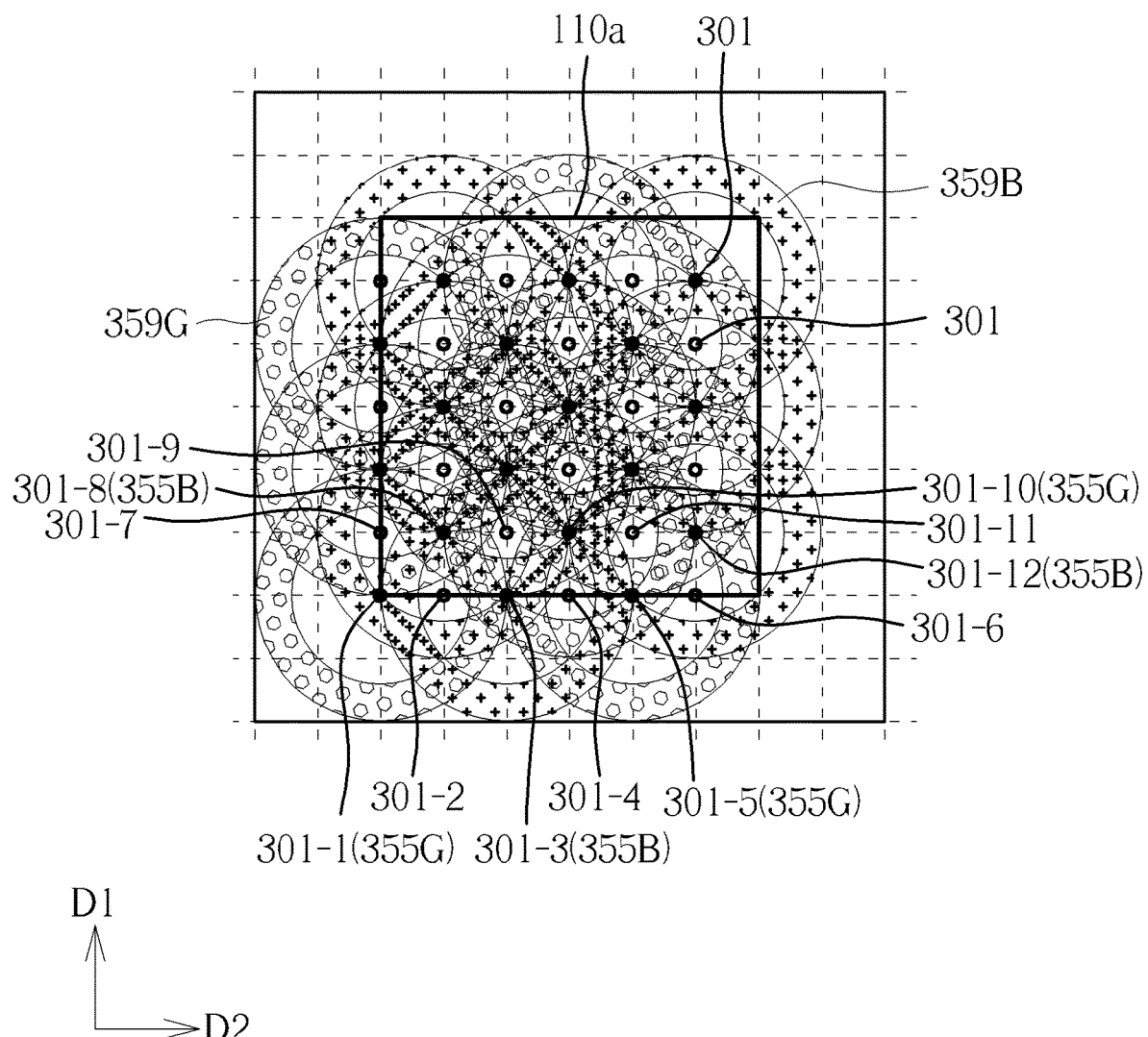

As shown in FIG. 13, the number of the light spot 355B, 355G may also be reduced since the sensing areas generated from adjacent scanning positions 301 may be similar or partially overlapped with each other. In FIG. 13, the scanning positions (such as the 1$^{st}$ scanning positions 301-1 and the 3$^{rd}$ position 301-3) that are intended to provide the light spots 355G, 355B are illustrated as solid black spots, and the scanning positions (such as the 2$^{nd}$ scanning positions 301-2 and the 4$^{th}$ position 301-4) that are not intended to provide the light spots 355G, 355B are illustrated as hollow black spot. Precisely, the light spot 355 of a part of the scanning positions such as the 2$^{nd}$ scanning position 301-2, the 4$^{th}$ scanning position 301-4, the 6$^{th}$ scanning position 301-6, the 7$^{th}$ scanning position 301-7, the 9$^{th}$ scanning position 301-9 or the 11$^{th}$ scanning position 301-11 may be optionally turned off, and the total number of the light spots 355B, 355G in the scan block 110a may be reduced, for example from 36 light spots 355G, 355B to 18 light spots 355G, 355B at the 1$^{st}$ (301-1, 355G), 3$^{rd}$ (301-3, 355B), 5$^{th}$(301-8, 355G), 8$^{th}$ (301-8, 355B), 10$^{th}$ (301-10, 355G), 12$^{th}$ (301-12, 355B), 13$^{th}$, 15$^{th}$, 17$^{th}$, 20$^{th}$, 22$^{nd}$, 24$^{th}$, 25$^{th}$, 27$^{th}$, 29$^{th}$, 32$^{nd}$, 34$^{th}$, 36$^{th}$ scanning positions 301 as shown in the right of FIG. 13 to generate corresponding target areas 359g, 359b and sensing areas (not shown in FIG. 13). However, please also note that, even the total number of the light spots 355B, 355G is reduced in the scan block 110a, the target areas 359G, 359B generated by the light spots 355B, 355G of the remaining scanning positions 301 still have to cover the whole area within the scan block 110a. As shown in FIG. 13, the repeated and overlapped target areas 359G, 359B are illustrated to show the coverage thereof within the scan block 110a. In another embodiment, a less number or a more number of the scanning positions 301 may also be optionally turned on or turned off based on the required resolution of the fingerprint image.

Then, the recording process of the present embodiment may also be performed, either by directly outputting the corresponding signal of the sensing areas 357 as a data matrix format, or outputting the corresponding signal as a data matrix format after compressing the data number or the data area of the sensing areas 357 and/or calculating to the target area. The details steps of the recording process in the present embodiment may be substantially similar to those of the aforementioned embodiment as shown in FIG. 7 to 8, and which may not be redundantly described thereinafter.

Please understand that, although each scan block 110a, 110b, 110c, 110d in the present embodiment is exemplified to include a 6*6 matrix (as shown in FIG. 10 to 13), the present disclose is not limited thereto. The number of matrix is only for example and may not be limited thereto. The number of the matrix is mainly related to the number of light spots 355, and the number of light spots 355 is related to a required resolution. For example, a small number matrix (such as a 4*4 matrix) may save more scanning time, and the image resolution obtained thereby may be relatively low. Thus, in another embodiment, the scan block 110a may be optionally split to any matrix based on a required resolution of the fingerprint image.

In summary, through the method of detecting the biometric recognition with the electronic device 100 in the present embodiment, a first color light spot (such as a green color light spot 355G) at a scanning position 301 of each of the plurality of scan block 110a, 110b, 110c, 110d is firstly turned on to generate a first color scanning light, and the first color scanning light is reflected by the pattern or the feature of a biometric object such as fingerprint. Next, the reflected first color scanning light is detected on a first color sensor unit (such as a green color sensor unit 157G) to generate a sensor area 357g or signal, and then, the signal is recorded as a target in a data format (as shown in FIG. 8 or FIG. 7) directly, or after compressing and/or calculating the signal. As following, a second color light spot (such as a blue color light spot 355B) at another scanning position 301 of each of the plurality of scan block 110a, 110b, 110c, 110d is turned on subsequently, to repeat the light scanning and recording processes above to obtain another signal to record as another target in the data format directly, or after compressing and/or calculating the signal. The first color light spot and the second color light spot are turned on alternately, to obtain uniform targets. After that, all of the targets are integrated to determine or to calculate the fingerprint image or any other biometric features. Thus, the present method may not only obtain a higher resolution or a higher contract ratio, but also may further achieve fast and efficient scanning process by using different color scanning lights.

People well skilled in the art should easily realize that the electronic device of the present disclosure is not limited to the aforementioned display device, and may further include a lighting device, an antenna device, a sensor device or a joint device, but is not limited thereto. The electronic device may optionally include a foldable electronic device or a flexible electronic device, such as a flexible liquid crystal (LC) display device or a flexible light emitting diode display device, and the light emitting display device for example includes an organic light emitting diode (OLED) or an inorganic light emitting diode (LED), and the LED for example includes a mini-LED, a micro-LED, a quantum-dot LED (QLED, QDLED) or a LED with any other suitable materials or materials in any combination, but is not limited thereto. The antenna device may be a liquid crystal antenna, but the present disclosure is not limited thereto. The joint device may be a display joint device or an antenna joint device, but the present disclosure is not limited thereto. It is noteworthy that the electronic device may be any variants, arrangements or combinations of the above, but the present disclosure is not limited thereto.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device comprising a detection region, wherein the electronic device comprises:
 a plurality of first units, wherein a portion of the plurality of first units is configured to generate a first signal;
 a plurality of second units, wherein a portion of the plurality of second units is configured to generate a second signal, and the first signal and the second signal have different properties,
 wherein the first signal comprises a first color light, the second signal comprises a second color light, and the first color light and the second color light have different colors,
 wherein when the detection region is detected, a first region is generated by the first signal, a second region is generated by the second signal, and the first region and the second region are generated simultaneously,
 wherein the first region is overlapped with the detection region, the second region is overlapped with the detection region, and the first region and the second region are at least partially overlapped; and
 a sensor module overlapped with the detection region, wherein the sensor module is configured to sense a feature in the detection region.

2. The electronic device according to claim 1, wherein the plurality of first units comprise a plurality of first color pixels, and the plurality of second units comprise a plurality of second color pixels.

3. The electronic device according to claim 2, wherein the plurality of first color pixels comprise first color filter units, and the plurality of second color pixels comprise second color filter units.

4. The electronic device according to claim 2, wherein the plurality of first units comprise one color selected from a group consisting of red color, green color, and blue color, and the plurality of second units comprise another color selected from the group consisting of red color, green color, and blue color.

5. The electronic device according to claim 1, wherein the plurality of first units comprise a plurality of first organic light emitting diodes, and the plurality of second units comprise a plurality of second organic light emitting diodes.

6. The electronic device according to claim 5, wherein the plurality of first organic light emitting diodes and the plurality of second organic light emitting diodes are of different colors.

7. The electronic device according to claim 1, wherein the plurality of first units comprise a plurality of first inorganic light emitting diodes, and the plurality of second units comprise a plurality of second inorganic light emitting diodes.

8. The electronic device according to claim 7, wherein the plurality of first inorganic light emitting diodes and the plurality of second inorganic light emitting diodes are of different colors.

9. The electronic device according to claim 1, wherein the sensor module comprises a photosensor.

10. The electronic device according to claim 1, wherein the feature comprises a biometric feature.

11. The electronic device according to claim 10, wherein the biometric feature comprises a fingerprint.

12. The electronic device according to claim 1, wherein the different properties comprises different patterns.

13. The electronic device according to claim 1, wherein the different properties comprises different light properties.

* * * * *